Dec. 3, 1957 G. V. RODGERS 2,815,505

INDICATOR ARRANGEMENT FOR RADIO ECHO SYSTEM

Filed Jan. 13, 1950 4 Sheets-Sheet 1

Inventor
G. VICTOR RODGERS

By Killman and Kerst
Attorney

Inventor
G. VICTOR RODGERS
By Killman and Kerst
Attorney

Inventor
G. VICTOR RODGERS
By Killman and Kerst
Attorney

Dec. 3, 1957 G. V. RODGERS 2,815,505

INDICATOR ARRANGEMENT FOR RADIO ECHO SYSTEM

Filed Jan. 13, 1950 4 Sheets-Sheet 4

Inventor
G. VICTOR RODGERS

By Killman and Kerst
Attorney

United States Patent Office 2,815,505

Patented Dec. 3, 1957

2,815,505

INDICATOR ARRANGEMENT FOR RADIO ECHO SYSTEM

George V. Rodgers, Lexington Park, Md., assignor to Bendix Aviation Corporation, Towson, Md., a corporation of Delaware Application January 13, 1950, Serial No. 138,420

16 Claims. (Cl. 343—11)

This invention relates to an arrangement for coordinating and presenting information derived from a plurality of radio echo systems which cooperate in the scanning of a common area.

Such systems are of particular value in the ground control of aircraft for the making of landings under conditions of low visibility. While the invention will be described in connection with a system used for such a purpose, it is to be understood that its use is not limited to ground control approach systems.

Such systems utilize a pair of radio echo detection devices which cooperate in the scanning of the approach to a landing area for the purpose of determining the position of an approaching aircraft, not only in range but also in azimuth and elevation. Each utilizes a narrow beam scanning in a straight line, the beam of one device scanning horizontally and that of the other device scanning vertically, with the scanning paths intersecting. Each scanning path must be brought to intersect the position of an incoming aircraft. The horizontal scanning path must be positioned vertically, or in elevation, to a level at which it intersects the aircraft and the vertical path must be adjusted in azimuth to the same end.

Each of the radio echo devices is provided with a cathode ray tube indicator which displays a sector of an expanded plan position indication of the approach area. The sector corresponds to the area scanned by the respective echo device. A cursor is provided for each display, when can be positioned to provide on the azimuth display a plan indication of the runway with respect to the area scanned and on the elevation display a representation of the desired glide path as viewed at right angles to its length.

The invention is concerned with the problem of maintaining the scanning path of the energy beam of each radio echo device in intersection with an incoming aircraft and of indicating to an observer the relative positions of the scanning path and the aircraft.

It is an object of the invention to provide an effective and reliable means for controlling the relative orientation of the energy beams of a pair of radio echo devices scanning along intersecting linear paths.

It is a further object of the invention to provide an effective and reliable means of indicating the orientation of the scanning path of each of said energy beams with respect to a targe which it is desired to illuminate with both beams.

The objects of the invention are realized by an arrangement in which controls are provided adjacent the indicator of the vertically scanning device for controlling the elevation of the scanning path of the horizontally scanning device and in which controls are likewise provided adjacent the indicator of the horizontally scanning device for controlling the azimuth of the scanning path of the vertically scanning device. Means are additionally provided for indicating on each indicator the orientation of the scanning path of the energy beam of the other device. This is accomplished by the generation of range marks and the blanking of the marks except over an area representative of the energy beam of the other device. It may also be accomplished by blanking the marks only over the area representative of the energy beam of the other device.

Referring now to the drawings.

Figure 1:
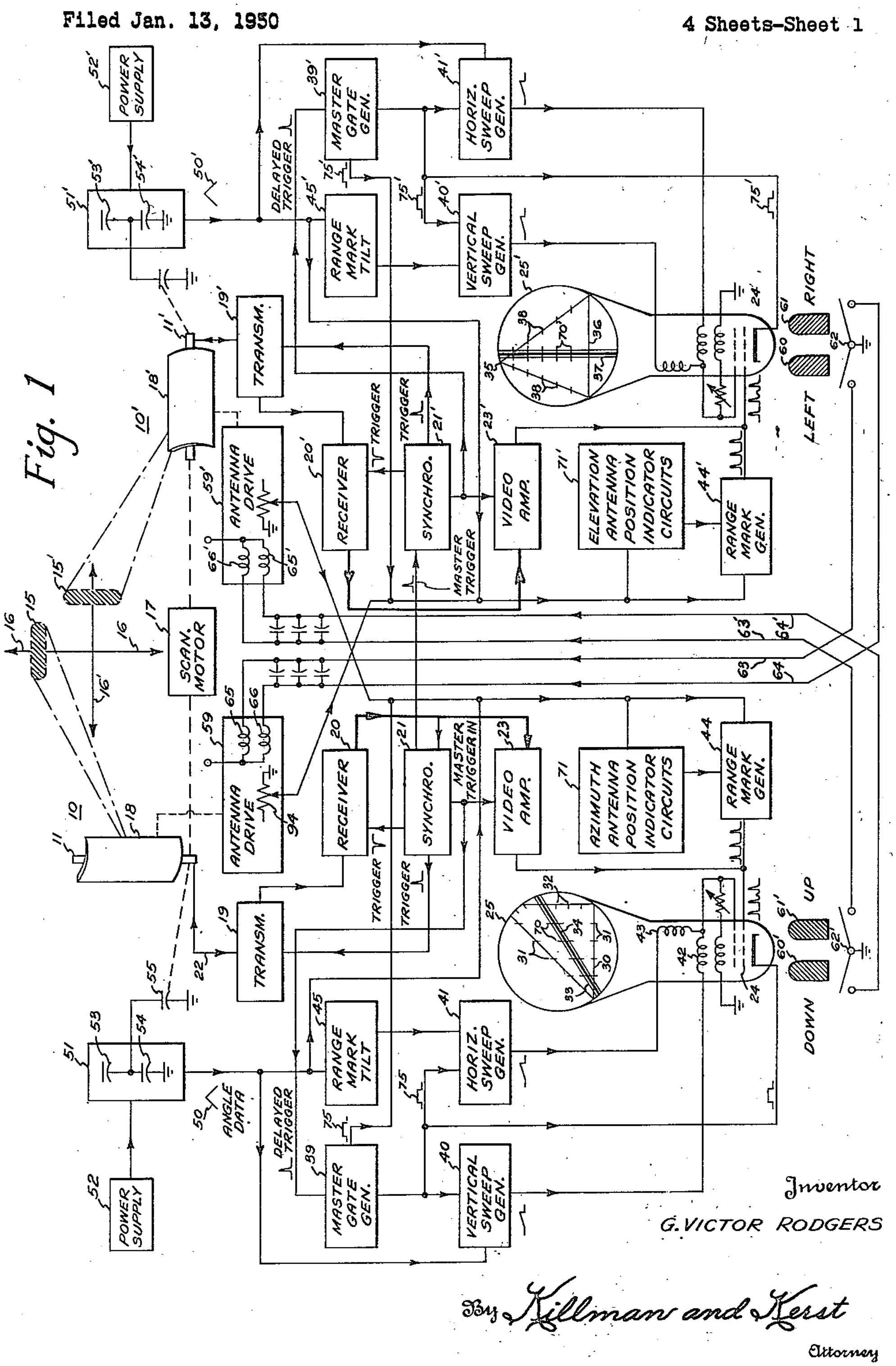
Fig. 1 is a schematic block diagram of a system embodying the invention.

In the circuit diagram of Fig. 1 the portion of the circuit on the left of the drawing relates to the radio echo device which scans in elevation, while that on the right relates to the device which scans in azimuth. Corresponding portions of the two devices are identified by the same reference numerals, those pertaining to the azimuth scanning device being primed.

The antenna 10 of the elevation scanning echo device is of the type described in volume 26, entitled "Radar Scanners and Radomes," of the Radiation Laboratory Series, published 1948 by McGraw-Hill Book Co., Inc., New York city. The description will be found on pages 185–193 inclusive. The antenna comprises a linear array of dipoles mounted on a variable width wave guide which is schematically indicated at 11.

Figure 3:
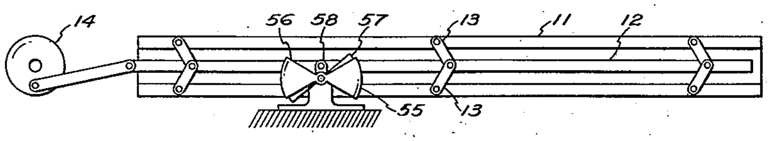
Fig. 3 is an elevational view of a portion of one of the antennas used in the system of Fig. 1 showing the means employed for deriving a voltage which is a function of the scan.

A more detailed illustration of the variable wave guide of the antenna is shown in Fig. 3. It is formed of two relatively sliding sections which are moved laterally with respect to each other to vary the cross section of the wave guide, the movement being accomplished by a mechanically driven push rod 12 which connects to the two sections by means of toggles 13. The mechanical driving means for the push rod is indicated by a crank device 14. The dipoles are not shown but will be found adequately described in the book referred to.

The linear array of spaced dipoles provides a narrow beam of energy having a cross section such as indicated at 15 in Fig. 1. Variation of the width of the wave guide changes the relative phase of the energy radiated by the dipoles and causes the beam to scan along a vertical path, as indicated by the arrows 16 in Fig. 1.

The antenna 10' of the azimuth scanning radio echo device is similar to the vertically scanning antenna but is mounted so that the dipole array extends in a horizontal direction and the energy beam 15' thus traverses a horizontal scanning path 16'. This path intersects the scanning path 16 of the other antenna as indicated in Fig. 1.

The wave guides of both antennas are cyclically varied in width by a common scan motor 17. The variable wave guide of each antenna is fixedly mounted with respect to a respective reflecting member 18 and 18' which can be moved about a pivot point to vary the orientation of the scanning path of the antenna. For example, the reflector 18 of the vertically scanning antenna is mounted for movement about one longitudinal edge whereby the scanning path of the energy beam may be positioned in azimuth. Likewise the reflector 18' of the azimuth antenna may be pivoted about its lower edge in order to position the scanning path of that antenna in elevation.

Each antenna is connected in the conventional manner to a representative radio echo device which may be of conventional construction. The radio echo device of the elevation scanning system is represented as a transmitter 19 and a receiver 20 which are supplied with synchronizing triggers from a synchronizer 21. The synchronizer is supplied with a master trigger voltage which is generated elsewhere in the system and supplied to both radio echo devices. The transmitter is shown as connected to the antenna through a conductor 22 by means of which energy from the transmitter is supplied to the antenna and energy reflected from objects illuminated by the energy beam is conveyed by way of a T-R box in the transmitter to the receiver. The video signal from the receiver is supplied by way of a video amplifier 23 to the control grid 24 of the cathode ray tube 25 associated with the device.

The radio echo device of the azimuth scanning system is similar to that just described and the components are indicated by the same numerals primed.

The displays provided by the two cathode ray tubes, while differing considerably in appearance, are of the same general type. Each comprises a sector of the conventional plan position indication which is normally used to reproduce the geographic features of the locality surrounding a radio echo device and to indicate the presence of man-made objects within such an area. In each of these displays, however, the sector of the plan position indication is oriented so as to present to an observer the indication of the relative location of an aircraft with respect to a desired glide path, as seen either from a position to one side of the glide path or as seen from a position above and looking along the length of the glide path.

The indicator of the vertically scanning system employs a presentation in which the lower edge 30 of the sector extends horizontally across the lower part of the tube face. The point of origin of the sector is at the left. Small etched portions of range marks 31 are marked on the tube face along the lateral edges of the sector. Indications of elevation angle may likewise be etched as at 32 along the vertical side of the sector. A cursor is provided which may be moved over the tube face and locked in position at any desired glide path angle and may thereafter be manually moved horizontally in order to intersect the indication of an incoming plane. The cursor may be a strip of transparent plastic, as indicated at 33, on which is marked a line 34 representative of the glide path.

The orientation of the display, to provide a sector extending in the manner illustrated, is accomplished by conventional means which does not form a part of this invention and it has, therefore, not been illustrated.

The display of the cathode ray tube 25' forming a part of the azimuth scanning system is oriented on the tube face so that the origin 35 lies along the upper portion of the tube periphery and the base 36 of the sector extends in a horizontal direction near the lower portion of the tube face. A cursor 37 similar to that described above is provided for the purpose of representing the location of the runway along which incoming planes are to land. It likewise is manually movable in a horizontal direction and can be locked in place in the proper position to indicate the location of the runway with respect to the scan of the azimuth antenna. This display presents to an observer an indication of the lateral position of the aircraft with respect to a vertical plane passing through the runway and the display is so oriented that the picture presented to the observer is the same as would be presented to the pilot of the aircraft coming in for a landing. Elected range marks 38 are provided along the lateral edges of the sector.

The radio devices are provided with the usual circuits for controlling the travel of the electron beam to secure the type of presentation that is used. Referring to the elevation scanning device, a master gate generating circuit is indicated at 39 which receives from the synchronizer circuit 21 a delayed trigger voltage. This gate generator circuit provides gating pulses each having a duration sufficient to allow the receipt of reflected energy throughout the range displayed on the indicator. These gating pulses are supplied to a vertical sweep generator circuit 40 and to a horizontal sweep generator circuit 41. These sweep generator circuits supply saw-tooth currents to the vertical and horizontal deflection coils 42 and 43 respectively. The sweep generator circuits are supplied with the proper bias voltage to position the origin of the indication at the desired point. A range mark generator circuit 44 is also supplied with gating voltage from the master gate generator 39. This circuit generates range marks at regular intervals which may be, for example, one mile intervals, in order to provide the operator with an accurate reference as to the range of an observed aircraft. The output of the range mark generator is combined with that of the video amplifier 23.

Figure 4:
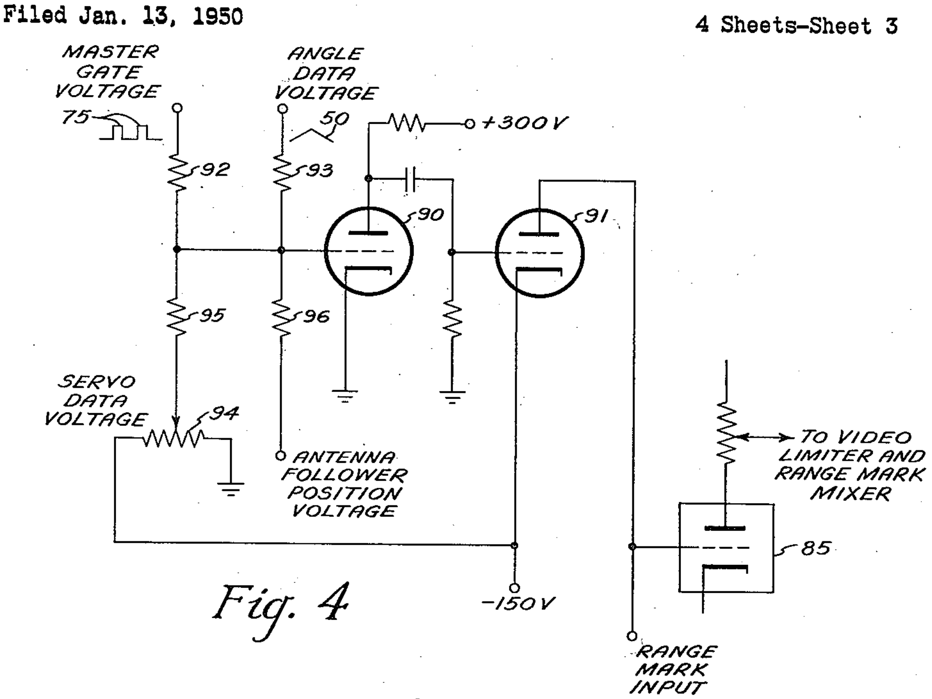
Fig. 4 is a schematic diagram of the circuit employed in blanking the range marks.

It will be noted that the displays on tubes 25 and 25' are of triangular form and that the fragments of range marks underlying the glide path cursors are straight lines. The usual sectorial plan position indication is in the form of a sector of a circle with range marks appearing as arcs of circles. The straight line appearance of the range marks is due to the use of an "expanded sweep." This means that the sweep current applied to one set of deflection coils of each tube is of much greater amplitude that that applied to the other set of coils. In connection with tube 25, the saw tooth wave form of current flow through the vertical deflection coils is of greater amplitude than that through the horizontal deflection coils with the result that the display is expanded in a vertical direction and the angular spread of the display is widened greatly over the actual angle swept through by the scan of the antenna. This has the effect of making the range marks appear to be straight lines. This conventional expedient is disclosed in Patent No. 2,459,481 to Wolff et al. of January 18, 1949. This display resulting from expansion is shown in Fig. 4 of the patent.

In order to cause the range marks to extend perpendicularly to the ground line of the display, use is made of a range mark tilt circuit 45 to progressively reduce the amplitude of the horizontal sweep current as the scan of the antenna increases in elevation. This circuit has applied to it the voltage 50 derived from a capacitive voltage divider 51 to which voltage from an A. C. power supply 52 is applied. The voltage divider is shown as composed of two condensers 53 and 54 in series, one of which is shunted by a variable condenser 55. The latter condenser is mounted upon the antenna 10 as more clearly shown in Fig. 3. As shown by way of example, the stator of the condenser is mounted upon a fixed base and the rotor 57 is connected by a crank 58 to the push rod 12 of the antenna and is moved therewith. The voltage across the condenser 55 is rectified to provide the voltage 50.

The voltage 50 is utilized in the range mark tilt circuit 45 as bias voltage to vary the plate potential of a vacuum tube. As the plate potential falls with the increase of the angle data voltage level that accompanies an increase in the scan elevation, the horizontal sweep generator, to which this potential is applied, will generate sweeps of lesser amplitude. The range tilt circuit is not a part of this invention and may be omitted if desired, since a display as shown in Fig. 4 of the above identified Wolff patent may be utilized in connection with the instant invention. The voltage 50 is further utilized in a manner which will be later described.

A voltage 50' having a similar wave form is derived in connection with the horizontally scanning antenna 10' by similar circuits and utilized in a similar fashion to produce the distorted presentation of cathode ray tube 25'.

The position in azimuth of scanning path 16 of antenna 10 is controlled by mechanical rotation of the reflector 18 about one of its longitudinal edges. This is accomplished by means of an antenna drive 59 which may be an electric motor. Control of the position of the scanning path exercised by an operator stationed adjacent the azimuth indicating cathode ray tube 25'. Control is exercised by means of a pair of foot pedals 60 and 61 shown below the cathode ray tube. These pedals operate a two-pole, single throw switch 62 to complete a circuit through one or other of the two conductors 63, 64. These conductors include field coils 65, 66 respectively, which control the direction of rotation of the motor in a well-known manner.

Similar foot pedals 60', 61' are provided adjacent the cathode ray tube 25 to operate a switch 62' for completing a circuit through either of the two conductors 63', 64' which control the rotation of a motor in the antenna drive 59' to position the scan path 16' of the antenna 10' in elevation. Similar field coils 65', 66' control the direction or rotation of this motor. Control of the position of the scan path 16' in elevation is accomplished by rotation of the reflector 18' about its lower longitudinal edge by means of the antenna drive 59'.

It will be noted that the display of each of the cathode ray tubes 25, 25' includes a plurality of range marks 70 and 70' respectively. These range marks do not extend across the whole display but consist, in each case, of short parallel marks arranged in sequence and equally spaced. The length of the range marks shown on the display of tube 25 is chosen to represent the width of the energy beam from the antenna 10' and the group of range marks on this display may be taken to represent the energy beam from that antenna and to indicate its elevation in space within the area defined by the boundaries of the display.

Likewise the range marks 70' perform the same function with respect to the energy beam 15 of the antenna 10 and indicate the azimuth of the energy beam of that antenna within the area defined by the limits of the display on the tube 25'.

The range marks 70 shown on the display 25 are formed by the range mark generator circuit 44 and their length is governed by the azimuth antenna position indicator circuits of the block 71. Likewise the range marks 70' shown on the tube 25' are generated by the range mark generator 44' and their length is controlled by the elevation antenna position indicator circuits of the block 71'. The manner in which the azimuth antenna position indicator circuits 71 function to control the length and positioning of the range marks 70 will now be indicated with respect to the elevation scanning system, it being understood that the operation of the elevation antenna position indicator circuits 71' with respect to the azimuth scanning system, is similar, the only difference being in the source of the voltages employed.

Figure 2:
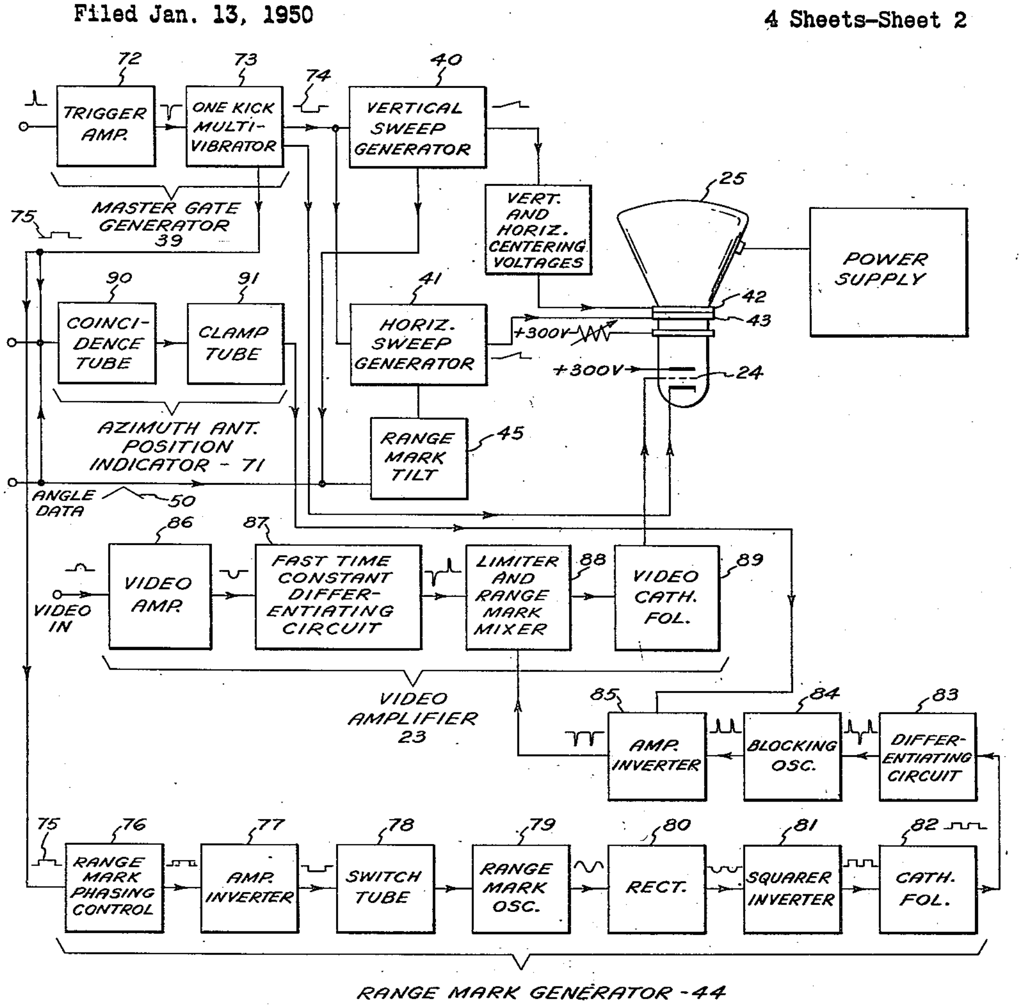
Fig. 2 is a schematic block diagram of the portion of the system of Fig. 1 which pertains to one of the radio echo devices.

Attention is invited to Fig. 2 in which the display controlling circuits of the elevation scanning system are broken down into greater detail, although still being shown in a block diagram.

The master gate generator 39 is shown as being composed of a trigger amplifier 72 and a one-kick multivibrator circuit 73. The trigger amplifier 72 receives a delayed trigger from the synchronizer 21 of Fig. 1, amplifies it, inverts it, and supplies it to the multivibrator 73. This circuit produces a gating voltage having the form indicated by the graph 74 or 75, depending upon its polarity. It can be seen that this output is a square pulse. This pulse is used for triggering purposes with respect to the various circuits and has a duration sufficient to allow the receipt of echoes from objects within the range of the indicators 25, 25'. It can be seen that this gating pulse is supplied to both the vertical sweep generator 40 and the horizontal sweep generator 41, wherein it governs the initiation and duration of the saw-tooth sweep voltages produced.

It is likewise applied to the range mark generator 44 which is shown as broken down into its component circuits. The first of these is a range mark phasing control circuit 76 which governs the phase of the range marks produced and thus may be used to position the first mark at the desired point of touchdown of the glide path. An amplifier inverter 77 amplifies and inverts the phase adjusted square wave 75 which is applied by a switch tube 78 to trigger a range mark oscillator 79 which produces a sinusoidal output of the proper frequency for the derivation of range marks having the desired spacing. This output is rectified in rectifier 80, squared and inverted by circuit 81 for this purpose, and applied by means of a cathode follower 82 to a differentiating circuit 83. The positive going pulses of the output of this circuit trigger a blocking oscillator 84 to produce spaced pulses as indicated. These, after amplification and inversion in a circuit 85, are applied to the video amplifier 23 wherein they are mixed with the video signal and applied to the control grid 24 of the cathode ray tube 25 to control the electron stream of that tube.

The video amplifier 23 is shown as composed of a video amplifier circuit 86 followed by a fast time constant differentiating circuit 87, the output of which is mixed in the limiter and mixer 88 with the range marks. The limiter and mixer 88 consists of an amplifier circuit to the input of which both the output of circuit 87 and the range mark signals are applied. The output of this circuit is an additive composite of the video and range mark signals. This composite signal is then applied to the control grid 24 by a cathode follower 89.

The range mark generator means, so far described, would produce and apply range marks over the whole width of the display. There remains to be described the antenna position indicator circuit which controls the length and location of the range marks in such a manner that they indicate for this system the location in elevation of the azimuth scanning antenna 10'.

In Fig. 2, this circuit 71 is shown as being comprised of a coincidence tube 90 followed by a clamp tube 91. The clamp tube 91 normally operates to render non-conductive the amplifier 85, thus preventing the output of range marks from the range mark generator 44. The function of the coincidence tube 90 is to nullify the action of the clamp tube 91 upon receipt by the former of the proper combination of voltages and thus to allow the generation of range marks while this combination of voltages is applied to the coincidence tube.

Figures 5, 6:
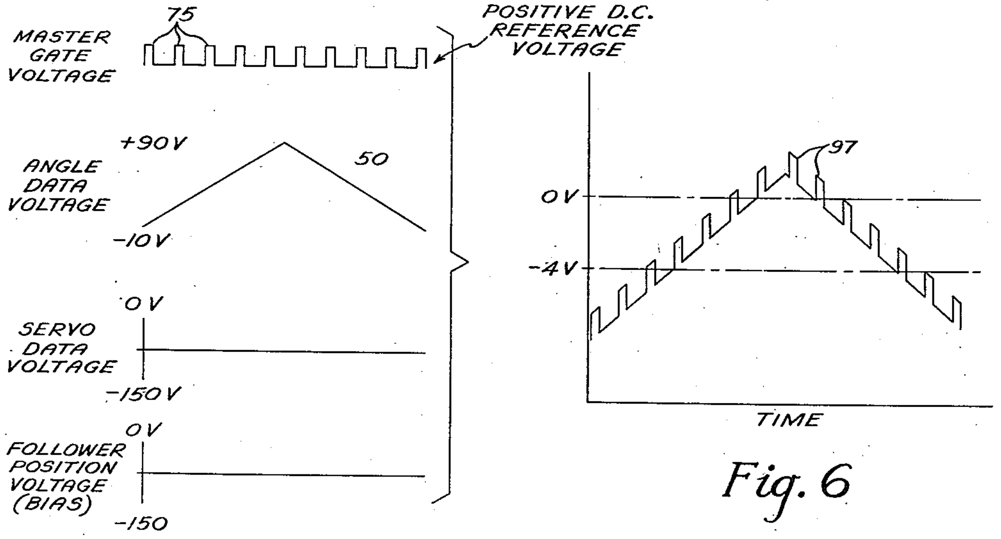
Figs. 5 and 6 are curves representing the voltages applied to the control grid of the coincidence tube of the circuit of Fig. 4.

In Fig. 4 will be found a more detailed schematic diagram of the azimuth antenna position indicator circuit 71. Fig. 5 displays the wave forms of the voltages applied to control the coincidence tube 90 and Fig. 6 shows the wave form of the resultant of these voltages.

Referring to Fig. 4, it will be seen that the coincidence tube 90 is connected in cascade with the clamp tube 91, the output of which is applied to the control grid of the amplifier inverter stage 85 of the range mark generator. The cathode of the clamp tube 91 is connected to a source of negative voltage. This tube is normally conducting and the application of its output to the control grid of the stage 85 causes that stage to be non-conductive so that range marks are not displayed on the cathode ray tube.

The circuit values of the coincidence tube circuit are so selected that this tube conducts only when voltages between −4 and 0 are applied to its control grid. Cut-off occurs at −4 volts and grid current saturation at 0 volts. The voltage on the control grid is the sum of four separate voltages which are applied thereto. The wave forms of these voltages are shown in Fig. 5. One of these is the master gate voltage which has been previously discussed. It will be remembered that this voltage comprises a series of gating pulses, each having a duration sufficient to allow the generation of one sweep of the vertical and horizontal deflection voltages and thus to allow one complete excursion of the electron beam across the display. This voltage is applied to the coincidence tube by way of resistor 92.

The angle data voltage 50 which is a function of the scan of the energy beam 15 is applied to the control grid through a resistor 93. The third voltage applied to the tube is the servo data voltage which is derived from a potentiometer 94' connected between a source of −150 volts and ground. This potentiometer is located at the antenna drive means 59', the movable contact being driven as a function of the rotation of the reflector 18' about its lower edge. This voltage is therefore a function of the elevation of the scanning path 16' of the antenna 10'. This voltage is applied to the coincidence tube through the resistor 95. The fourth voltage which is applied to the coincidence tube is the antenna follower position voltage applied to the resistor 96. This voltage is a calibration voltage, its value being manually selected to position the array of range marks at the desired location on the display for a given elevation of the azimuth antenna scan path.

The shape of the wave form of the resultant of these four voltages is shown in Fig. 6 in which the abscissa is time and the ordinates represent voltage. The range of −4 volts to 0 volts is indicated, this being the range of values of the resultant voltage required to cause the coincidence tube 90 to conduct in a manner to cut-off space current flow through the clamp tube 91. It will be seen that the resultant voltage wave form has the shape of an inverted V with the spaced pulses erected upon it. These pulses 97 are derived from the master gate voltage and correspond to the gating pulses 75. From this wave form it can be seen that the amplitude of the gating pulses 75 controls the length of the range mark fragments which are allowed to be produced on the display of the tube 25. This is true because the amplitude of the pulses 97 controls the number of pulses which penetrate into the voltage range necessary to make the tube conduct. At any voltage value below −4 volts the coincidence tube is cut-off and at any voltage above 0 volts the tube is saturated, either condition preventing change in plate current necessary to pass the master gate. The amplitude of the gating pulses 75 is fixed at a value selected to provide a fan of range marks, the width of the fan being representative of the actual width of the energy beam 15'. This causes the fan of range marks on the tube 25 to act as a representation of the shape and position of the energy beam 15' in elevation.

By observing the fan of range marks 70, the operator stationed at the tube 25 can easily tell whether the azimuth antenna is positioned properly in elevation to illuminate the desired aircraft and if it is not, he can, by actuating the proper one of the pedals 60', 61' cause the energy beam 15' to be properly positioned. The position of the cursor 33 can be used to generate servo voltages for the actuation of remote indicators to automatically indicate the error of the instantaneous position of the illuminated aircraft with respect to the desired glide path, the cursor being maintained in coincidence with the target indication by manual means.

While only the azimuth antenna position indicator circuits have been described, it should be understood that the block 71' represents elevation antenna position indicator circuits which operate in the same manner to control the position and length of the range marks 70' upon the display of cathode ray tube 25'. In this case the angle data voltage 50' derived from the capacitor voltage divider 53' is utilized together with the master gate voltage 75' from the master gate generator 39' and servo data voltage derived from potentiometer 94 located at the antenna drive 59. The resultant range marks 70' then constitute a visual representation of the actual shape and position in azimuth of the scan path 16 of antenna 10. The operator at this tube can likewise control the azimuth of this antenna by means of the foot pedals 60, 62. The position of the cursor 37 is likewise available for the generation of servo voltages indicative of the lateral error with respect to the glide path of the instantaneous position of an illuminated aircraft.

Figure 7:
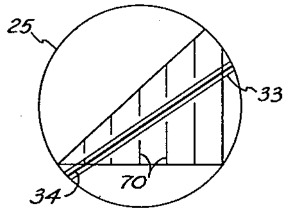
Fig. 7 is a plan view of the face of the elevation indicator showing a modified presentation in accordance with a modification of the system of Figs. 1 to 6.

An alternative manner of indicating the position of the antenna of one system upon the indicator associated with the other system involves the blanking of the range marks only over an area representative of the antenna position. Such a manner of presentation is illustrated in Fig. 7 which shows the display of the tube 25 with the range marks fully visible over all of the display except for a portion in the region of the cursor 33, the area without range marks constituting a representation of the energy beam of the azimuth antenna.

Figure 8:
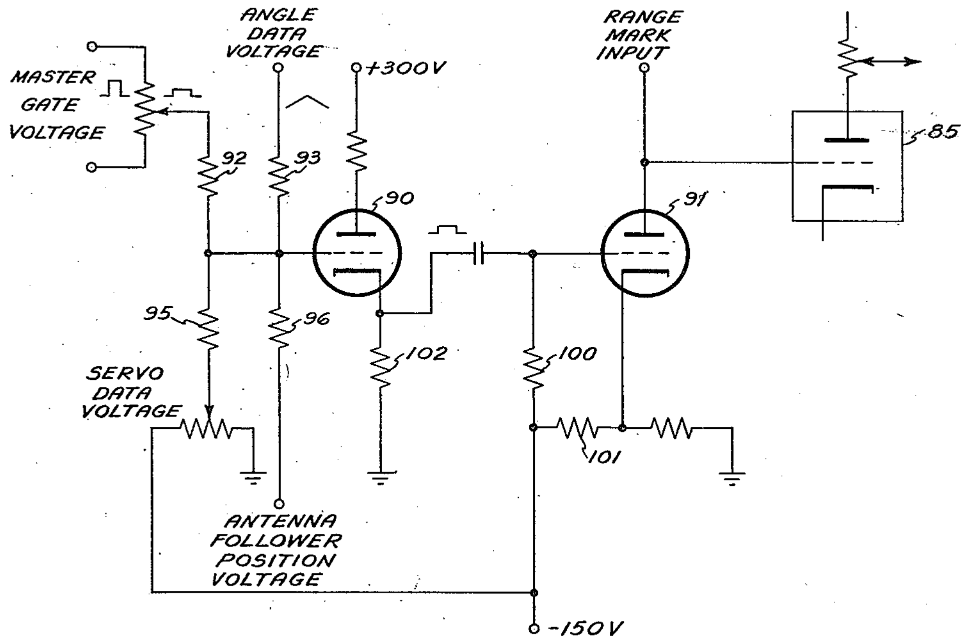
Fig. 8 is a schematic diagram of the circuit employed in blanking the range marks in the manner necessary to achieve the type of presentation of Fig. 7.

Manipulation of the range marks in this fashion is accomplished by a circuit very similar to that shown in Fig. 4 and which is illustrated in Fig. 8. This circuit likewise employs the coincidence tube 90 and the clamping tube 91, the output of which is applied to the control grid of the amplifier 85. However, in this circuit both grid and cathode of the clamping tube 91 are connected through resistors 100 and 101, respectively, to a source of negative voltage which normally renders the clamping tube non-conductive and allows the range mark amplifier to conduct.

The voltages applied to the control grid of this tube are the same as were applied in Fig. 4. These voltages cause the coincidence tube to be normally non-conducting. The output of this tube is applied to the control grid of clamping tube 91 through a connection taken across a resistor 102 in its cathode circuit. During the application of each of the gating pulses to the grid of tube 90, when the value of the angle data voltage reaches the proper level, tube 91 will conduct and will produce a positive gating pulse in its output as indicated. This pulse being applied to the grid 91 will cause that tube to conduct and will drive the amplifier 85 below cut-off, thus preventing the application of range mark generating pulses to the cathode-ray tube. The result will be a suppression of range marks over an area of the display representative of the position of the energy beam of the azimuth antenna.

Although the circuit of Fig. 8 has been described with reference to ground controlled approach systems, it is useful in connection with any echo ranging system employing range marks where it is desired to remove the marks from a particular sector of the display in order to clarify the appearance of target indications.

What is claimed is:

1. In a system including means for developing a variable voltage the value of which corresponds to the position of element movable in a plane in a repetitive pattern and a cathode ray tube having associated with it means for deflecting the cathode ray beam thereof in accordance with said voltage; means for indicating on the screen of said tube the position of a second element which is independently movable in said plane within the pattern of movement of the first said element, comprising in combination means for developing a second voltage which has a predetermined value for every position of the second element, means deriving a voltage the value of which is the sum of the values of said voltages, means modulating the intensity of the cathode ray beam of said tube to cause said beam to generate reference indicia on said screen as it is deflected and control means for said modulating means, said control means being responsive to said derived voltage and operative as the value of said derived voltage crosses the boundaries of a pre-selected range of values to alter said modulation and thus changing the appearance of said indicia.

2. In a radar system having one radar antenna which scans along a definite coordinate of a system of coordinates, its video output being displayed with respect to that coordinate on the screen of a cathode ray tube, and having an element which is independently movable in the same coordinate; means for displaying on the screen of the cathode ray tube the position of said element along said coordinate, comprising in combination means for developing two voltages the values of which correspond respectively to the scanning position of the first antenna and to the variable position of the element, circuit means capable of two electrical conditions and shiftable from one of said electrical conditions to the other as the sum of the values of said voltages crosses the boundaries of a preselected range of values, means modulating the intensity of the cathode ray beam of said tube to generate reference traces on the screen thereof as said beam is deflected and means responsive to one of said electrical conditions of said circuit means to reduce the intensity of said cathode ray beam below the level required for the generation of visible traces.

3. In a system including a cathode ray tube, an element subject to repetitive movement along a definite coordinate of a system of coordinates, and means causing the cathode ray beam of said tube to trace on the screen of said tube a pattern which is generated synchronously with the movement of said element; means for indicating on said screen the position of a second element movable in said coordinate independently of the first said element, comprising in combination means for developing a pair of voltages each commensurate with the instantaneous position in said coordinate of a respective one of said elements, means deriving a voltage the value of which is equal to the sum of the values of said pair of voltages, means modulating said cathode ray beam operable to cause said beam to generate reference indicia on the screen of said tube as it is deflected, said reference indicia being distributed through said pattern, and means responsive to said derived voltage to alter the visibility of said indicia as the value of said derived voltage crosses the boundaries of a predetermined range of values.

4. In a system including a cathode ray tube, an element subject to repetitive movement in a definite coordinate of a system of coordinates, and means causing the cathode ray beam of said tube to trace on the screen of said tube a pattern which is generated synchronously with the movement of said element; means for indicating on said screen the position of a second element movable in said coordinate independently of the first said element, comprising in combination means for developing a pair of voltages each commensurate with the instantaneous position in said coordinate of a respective one of said elements, means deriving a voltage the value of which is equal to the sum of the values of said pair of voltages, means modulating said cathode ray beam to cause said beam to generate reference indicia on the screen of said tube, said reference indicia being distributed through said pattern, and means operable when the value of said derived voltage lies within a predetermined range of values to render the last named means inoperable.

5. In a system including a cathode ray tube, an element subject to repetitive movement in a definite coordinate of a system of coordinates, and means causing the cathode ray beam of said tube to trace on the screen of said tube a pattern which is generated synchronously with the movement of said element; means for indicating on said screen the position of a second element movable in said coordinate independently of the first said element, comprising in combination means for developing a pair of voltages each commensurate with the instantaneous position in said coordinate of a respective one of said elements, means deriving a voltage the value of which is equal to the sum of the values of said pair of voltages, and means operable by said derived voltage when the value thereof lies within a predetermined range of values to periodically modulate the intensity of said cathode ray beam thereby causing said beam to generate a pattern of recurring reference indicia throughout a portion of the first mentioned pattern.

6. In a system including a cathode ray tube, an element subject to repetitive movement in a definite coordinate, and means causing the cathode ray beam of said tube to trace on the screen of said tube a pattern which is generated synchronously with the movement of said element; means for indicating on said screen the position of a second element movable in said coordinate independently of the first said element, comprising in combination means for developing a pair of voltages each commensurate with the instantaneous position in said coordinate of a respective one of said elements, means deriving a voltage the value of which is equal to the sum of the values of said pair of voltages, means synchronized with said means causing the tracing of said pattern and operable to periodically intensify said cathode ray beam and thereby produce a succession of reference indicia on the face of said tube, a source of disabling voltage; means normally clamping said indicia producing means to said source in a manner to render it inoperative, and means responsive to said derived voltage and operable when the value thereof lies within a predetermined range of values to disable said clamping means.

7. In a system including a cathode ray tube, an element subject to repetitive movement in a definite coordinate, and means causing the cathode ray beam of said tube to trace on the screen of said tube a pattern which moves synchronously with the movement of said element; means for indicating on said screen the position of a second element movable in said coordinate independently of the first said element, comprising in combination means for developing a pair of voltages each commensurate with the instantaneous position in said coordinate of a respective one of said elements, means deriving a voltage the value of which is equal to the sum of the values of said pair of voltages, means synchronized with said means causing the tracing of said pattern and operable to periodically intensify said cathode ray beam and thereby produce a succession of reference indicia on the face of said tube, a source of disabling voltage; and means responsive to said derived voltage and operable when the value thereof lies within a predetermined range of values to apply the output of source to said indicia producing means in a manner to render said indicia producing means inoperative.

8. In a radio echo object detection apparatus, a pair of radio echo systems, each having a directive antenna, means causing the energy beam of the antenna of each system to scan linearly along a path normal to the scanning path of the energy beam of the other antenna, an indicator comprising a cathode ray tube forming a part of each of said systems, said tube being connected to present a plan position indication of the presence of objects illuminated by the energy beam of said system, means for generating on each of said plan position indications spaced marks representative of selected ranges from said apparatus, means adjacent each of said indicators for controlling the orientation of the beam of the other system in a direction normal to its scanning path, and means controlled by the antenna of said other system to blank said range representing marks except over a portion of said plan position indication representative of the scanning path of said antenna as so orientated.

9. In a radio echo object detection apparatus, a first radio echo system including a vertically scanning directive antenna, a second radio echo system including a horizontally scanning directive antenna, an indicator comprising a cathode ray tube forming a part of each of said systems, said tube being connected to present a plan position indication of the presence of objects illuminated by the energy beam of said system, an individual driving means for each of said antennas, means adjacent the indicator of each of said systems for controlling the orientation of the beam of the antenna of the other system in a direction normal to its scanning path, means for generating on each of said plan position indications spaced marks representative of selected ranges from said apparatus, means actuated by the driving means of the vertically scanning antenna to blank said marks on the indication of the horizontally scanning system except over a portion of said indication representative of the scanning path of said vertically scanning antenna, and means actuated by the driving means of the horizontally scanning antenna to blank said marks on the indication of the vertically scanning system except over a portion of said indication representative of the scanning path of said horizontally scanning antenna.

10. In a radio echo object detection apparatus, a first radio echo system including a vertically scanning directive antenna, a second radio echo system including a horizontally scanning directive antenna, an indicator comprising a cathode ray tube forming a part of each of said systems, said tube being connected to present a plan position indication of the presence of objects illuminated by the energy beam of said system, an individual driving means for each of said antennas, means adjacent the indicator of each of said systems for controlling the orientation of the beam of the antenna of the other system in a direction normal to its scanning path, means for generating on each of said plan position indications spaced marks representative of selected ranges from said apparatus, means forming a part of each of said systems and normally blanking said marks on the indication of the system of which it is a part, means operative to nullify the action of said blanking means, means deriving a voltage which is a function of the instantaneous position of the energy beam of said system along its scanning path, means deriving a voltage which is a function of the said orientation of the scanning path of the energy beam of the other of said systems, means combining said derived voltages and means applying said combined voltages to said nullifying means to control the operation thereof.

11. In a radio echo object detection apparatus, a pair of radio echo systems, each having a directive antenna, means causing the energy beam of the antenna of each system to scan linearly along a path normal to the scanning path of the energy beam of the other antenna, an indicator comprising a cathode ray tube forming a part of each of said systems, said tube being connected to present a plan position indication of the presence of objects illuminated by the energy beam of said system, means for generating on each of said plan position indications spaced marks representative of selected ranges from said apparatus, means adjacent each of said indicators for controlling the orientation of the beam of the other system in a direction normal to its scanning path, and means controlled by the antenna of said other system to blank said range representing marks over a portion of said plan position indication representative of the scanning path of said antenna as so oriented.

12. In a radio echo object detection apparatus, a first radio echo system including a vertically scanning directive antenna, a second radio echo system including a horizontally scanning directive antenna, an indicator comprising a cathode ray tube forming a part of each of said systems, said tube being connected to present a plan position indication of the presence of objects illuminated by the energy beam of said system, an individual driving means for each of said antennas, means adjacent the indicator of each of said systems for controlling the orientation of the beam of the antenna of the other system in a direction normal to its scanning path, means for generating on each of said plan position indications spaced marks representative of selected ranges from said apparatus, means actuated by the driving means of the vertically scanning antenna to blank said marks on the indication of the horizontally scanning system over a portion of said indication representative of the scanning path of said vertically scanning antenna, and means actuated by the driving means of the horizontally scanning antenna to blank said marks on the indication of the vertically scanning system over a portion of said indication representative of the scanning path of said horizontally scanning antenna.

13. In a radio echo object detection apparatus, a first radio echo system including a vertically scanning directive antenna, a second radio echo system including a horizontally scanning directive antenna, an indicator comprising a cathode ray tube forming a part of each of said systems, said tube being connected to present a plan position indication of the presence of objects illuminated by the energy beam of said system, an individual driving means for each of said antennas, means adjacent the indicator of each of said systems for controlling the orientation of the beam of the antenna of the other system in a direction normal to its scanning path, means for generating on each of said plan position indications spaced marks representative of selected ranges from said apparatus, means forming a part of each of said systems and effective to blank said marks on the indication of the system of which it is a part, said blanking means being normally inoperative, means deriving a voltage which is a function of the instantaneous position of the energy beam of said system along its scanning path, means deriving a voltage which is a function of the said orientation of the scanning path of the energy beam of the other of said systems, means combining said derived voltages and means applying said combined voltages to said blanking means, said blanking means being rendered operative in response to a predetermined range of values of said combined voltages.

14. In a system including means for developing a variable voltage the value of which corresponds to the position of an element movable in a plane in a repetitive pattern and a cathode ray tube having associated with it means for deflecting the cathode ray beam thereof in accordance with said voltage; means for indicating on the screen of said tube the position of a second element which is independently movable in said plane within the pattern of movement of the first said element, comprising in combination means for developing a second voltage which has a predetermined value for every position of the second element, means modulating the intensity of the cathode ray beam of said tube to cause said beam to generate reference indicia on said screen as it is deflected, means effective to control the intensity of said indicia, said control means being responsive to voltages within a predetermined range of values to maintain the intensity of said indicia at one value and to voltages outside said range of values to maintain the intensity of said marks at a second value, means combining said variable voltage and said second voltage to provide a resultant voltage varying through said range, and means applying said resultant voltage to said control means.

15. In a radio echo object detection apparatus, a first radio echo system including a vertically scanning directive antenna, a second radio echo system including a horizontally scanning directive antenna, an indicator comprising a cathode ray tube forming a part of each of said systems, said tube being connected to present a plan position indication of the presence of objects illuminated by the energy beam of said system, an individual driving means for each of said antennas, means adjacent the indicator of each of said systems for controlling the orientation of the beam of the antenna of the other system in a direction normal to its scanning path, means for generating on each of said plan position indications spaced marks representative of selected ranges from said apparatus, means forming a part of each of said systems and effective to control the intensity of said marks on the indication of the system of which it is a part, said control means being responsive to voltages within a predetermined range of values to maintain the intensity of said marks at one value and to voltages outside said range of values to maintain the intensity of said marks at a second value, means in each system deriving a voltage which is a function of the instantaneous position of the energy beam of said system along its scanning path, means deriving a voltage which is a function of the said orientation of the scanning path of the energy beam of the other of said systems, means combining said derived voltages to provide a resultant varying through said range, and means applying said resultant voltage to said control means.

16. In a system of the character described, a range mark generator for producing range marks, means for developing a variable voltage the value of which corresponds to the position of a movable element, a cathode ray tube having a fluorescent screen and having associated with it means for producing in it an electronic beam and means for deflecting the beam in accordance with said voltage; means for indicating on the screen the position of a second element which is independently movable in spatial relation to the first said element, comprising in combination, means for developing a second voltage which has a predetermined value for every position of the second element, means for comparing the first voltage with the second mentioned voltage, means acting by virtue of the two voltages attaining a predetermined relationship to modulate the intensity of said range marks, and means applying the intensity modulated range marks to an intensity control electrode of the cathode ray beam.

References Cited in the file of this patent

UNITED STATES PATENTS

| | | |
|---|---|---|
| 2,419,239 | White | Apr. 22, 1947 |
| 2,425,330 | Kenyon | Aug. 12, 1947 |
| 2,427,905 | Fyler | Sept. 23, 1947 |
| 2,432,330 | Norgaard | Dec. 9, 1947 |
| 2,433,002 | Norton et al. | Dec. 23, 1947 |
| 2,459,481 | Wolff et al. | Jan. 18, 1949 |
| 2,471,516 | Bryant | May 31, 1949 |
| 2,483,644 | Kelsey | Oct. 4, 1949 |
| 2,549,641 | Schrader | Apr. 17, 1951 |
| 2,572,975 | Berger | Oct. 30, 1951 |
| 2,585,855 | Sherwin et al. | Feb. 12, 1952 |

FOREIGN PATENTS

| | | |
|---|---|---|
| 543,638 | Great Britain | Mar. 5, 1942 |